CLOSED LOOP ADAPTIVE ECHO CANCELLER USING GENERALIZED FILTER NETWORKS

Filed Oct. 31, 1966

INVENTOR
M. M. SONDHI
BY
ATTORNEY

United States Patent Office 3,499,999
Patented Mar. 10, 1970

3,499,999

CLOSED LOOP ADAPTIVE ECHO CANCELLER USING GENERALIZED FILTER NETWORKS

Man M. Sondhi, Princeton, N.J., assignor to Bell Telephone Laboratories, Incorporated, Murray Hill, N.J., a corporation of New York Filed Oct. 31, 1966, Ser. No. 590,583
Int. Cl. H04b 3/20; H04m 9/08
U.S. Cl. 179—170.2 15 Claims

ABSTRACT OF THE DISCLOSURE

Operation of a closed-loop echo cancellation system for use in a two-way communication circuit is improved by employing an adjustable generalized filter network. Signals incoming to a four-wire to two-wire junction are supplied to the generalized filter network which, under control of an error signal derived from signals in the outgoing path, develops a replica of an undesired echo. The replica signal is subtracted from outgoing signals and the differential is used for the derivation of a new error signal.

Figure 1:
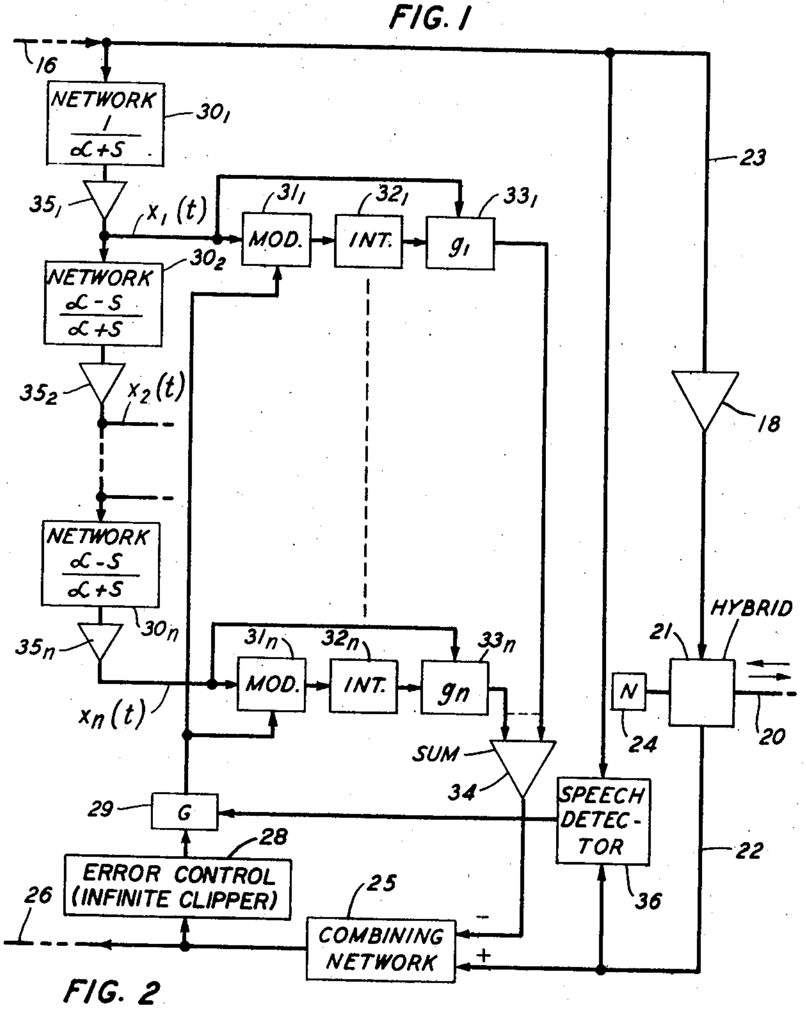

This invention relates to the suppression of echoes in communication channels and more particularly to the effective cancellation of echoes in a two-way telephone circuit of extremely long length such as, for example, a circuit completed by way of a satellite repeater in orbit about the earth. Its principal object is to afford improved protection against echoes irrespective of the length of the transmission circuits in use.

Echoes occur in telephone circuits when electrical signals meet imperfectly matched impedance junctions and are partially reflected back to the talker. Because such signals require a finite travel time, this reflected energy, or echo, is heard some time after the speech is transmitted. As distances increase, the echo takes longer to reach the talker and becomes more and more annoying. An attempt is therefore generally made to control these reflections with voice-operated devices, known as echo suppressors. Conventional echo suppressors combat echo generated at hybrid junctions in long distance communications circuits by interrupting the outgoing, or return, path according to some decision based upon the relative levels of the incoming and outgoing signals. Since an interruption of the return signal path also interrupts the outgoing signal circuit, the use of such suppressors, particularly in extremely long circuits, causes much talker confusion. In effect, such echo suppressors introduce chopping of the outgoing signal during periods of double-talking, i.e., during periods when the two speakers are talking simultaneously. It is apparent therefore that cancellation of echoes in the return signal path without an interruption of the path itself is necessary for satisfactory communications in circuits of extended length.

It is thus an object of this invention to improve the quality of speech or other communications signals transmitted over long distance circuits by substantially eliminating echo returns without, however, impeding the free flow of conversation in both directions.

One solution to the problem is disclosed in a concurrently filed application of J. L. Kelly, Jr. and B. F. Logan, Ser. No. 591,382, in which a replica of the echo is developed by synthesizing a linear approximation to the echo transmission path. The replica signal is subtracted from the return signal. Such a system, which is aptly described as an echo canceller to distinguish it from conventional echo suppressors, is characterized by a closed loop error control system. It is self-adapting in that it automatically tracks variations in the echo path which may arise during a conversation, for example, as additional circuits re connected or disconnected.

The closed loop echo canceller described in the abovementioned Kelly-Logan application synthesizes a linear approximation to the echo transmission path by means of a transversal filter. In conventional fashion, the filter comprises a delay line having a number of taps spaced along its length, preferably at Nyquist intervals. It develops a number of delayed replicas of the applied signal, each of which is independently adjusted in gain and polarity. The adjusted signals are then algebraically combined and subtracted from signals in the outgoing circuit.

The theory of operation and proof of convergence of the closed loop canceller, as set forth in Kelly-Logan application, are based on the linear treatment of a plurality of delayed signals, $x_i(t)$, adjusted in gain by a series of functions $g_i(t)$. In a typical implementation, the $x_i(t)$ signals are obtained from approximately 50 taps spaced at approximately 0.1 msec. intervals along the delay line. Although the system achieves cancellation on the order of 60 db or more and convergence in about 0.5 sec. period for normal speech levels, the structure is relatively costly to manufacture, primarily because of the tapped delay line. Moreover, the delay line is a relatively large structure; miniaturization of the echo canceller is difficult.

It is thus another object of this invention to simplify the implementation of a closed loop echo canceller.

It has been found that suitable convergence and effective suppression may be achieved in a closed loop system by utilizing, in place of a tapped delay line system, a system or generalized filter networks. A number of such networks may be adjusted to develop a set of impulse responses such that a linear combination of them is a good approximation to most practical echo impulse responses.

Thus, this invention is directed specifically to a closed loop echo canceller in which replicas of the echo signal reaching the outgoing (return) path of a two-wire to four-wire network junction are developed by passing incoming signals through a plurality of generalized filter networks to produce a number of linear transformations of the input signal. These transformations are then selectively adjusted in gain under control of a differential outgoing signal in the manner taught by Kelly and Logan. The resultant signal is a good approximation to the echo and may be subtracted from signals in the outgoing circuit. The circuit is not broken, however, so that double talking may take place even though both talkers are relieved of the confusion normal to a circuit contaminated by echo.

Although the individual networks used in developing the $x_i(t)$ transformation signals may take a variety of forms, for example, pairs of bandpass filters each with responses that are in phase quadrature with one another, it has been found that a simple tapped active RC ladder network adjusted to give Laguerre function impulse responses is particularly suitable. The properties and synthesis of Laguerre networks are described in the literature, for example, in "Statistical Theory of Communication" by Y. W. Lee, John Wiley & Sons, Inc. (1960). Such a ladder network of Laguerre functions may be easily implemented, and is amenable to thin $n$ film and integrated circuit technologies.

Figure 2:
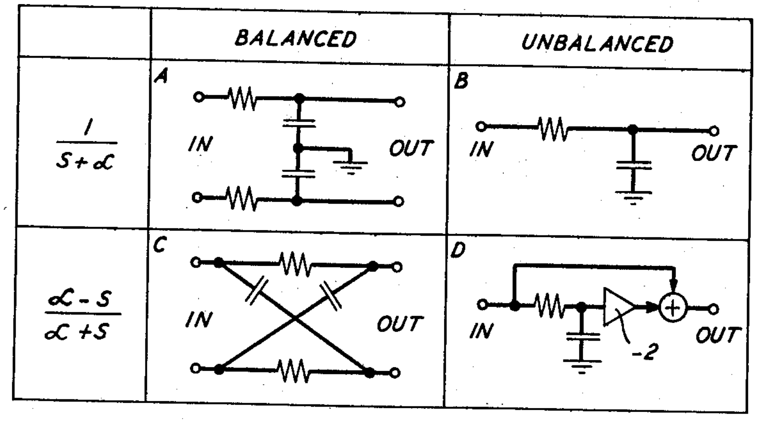

The invention will be more fully apprehended from the following detailed description of an illustrative embodiment thereof taken in connection with the appended drawing in which:

FIG. 1 is a block schematic diagram showing an adaptive echo canceller embodying the principles of the invention connected in circuit relation with a hybrid junction; and FIG. 2 illustrates a number of suitable networks for use in the echo canceller apparatus of FIG. 1.

FIG. 1 illustrates a signal transmission terminal for interconnecting a single two-way circuit 20 with two one-way circuits 22 and 23. Local circuit 20 typically is a conventional two-wire telephone circuit connecting a subscriber to circuits 22 and 23 by way of hybrid network 11. The impedance of local circuit 20 is matched insofar as possible by balancing network 24 associated with hybrid 21. Ideally, all incoming currents received from transmission link 16 are delivered by way of circuit 23 and isolating amplifier 18 to local circuit 20. None of this energy should be transferred to outgoing circuit 22. Similarly, all of the energy reaching hybrid 21 from local circuit 20 should be delivered to outgoing circuit 22. Unfortunately, the balancing network generally provides only a partial match to the two-wire circuit so that a portion of the incoming signal (from circuit 23) reaches the outgoing circuit (circuit 22). In the absence of adequate suppression of this signal component, or echo, the signal accompanies outgoing signals which originated in circuit 20 and are delivered to transmission link 26. Upon reachng the distant station this signal, which originated there in the first place, is perceived as an echo. Accordingly, echo cancellation apparatus is employed to eliminate the return signal.

In accordance with this invention, the echo is cancelled without interrupting either the incoming or the outgoing circuits. In a manner similar to that described in the aforementioned Kelly-Logan application, incoming signals in circuit 23 are passed through a synthesized network to produce, at the output of summing amplifier 34, a replica of the echo signal. The replica signal is algebraically subtracted from the signals outgoing in circuit 22 through the action of combining network 25. Signals leaving network 25 therefore are devoid of echo components. These signals are delivered to transmission network 26.

Since the characteristic of the echo signal continuously changes, it is necessary to adjust the synthesized network continuously in accordance with the change. It is in accordance with the invention, therefore, to synthesize the echo signal by passing the incoming signals through a tandem connection of generalized filter networks $30_1$, $30_2$, . . . $30_n$ to produce at the junctions of the several networks a series of transformations $x_i(t)$ of the incoming signal. It has been found that the individual networks 30 are best chosen to be Laguerre networks. The impulse response of the *n*th Laguerre network is given by $$L_n(t)=e^{\alpha t}\frac{d^n}{dt^n}\left(\frac{t^n}{n'}e^{-2\alpha t}\right) \qquad (1)$$

with the corresponding transfer function $$L_n(s)=\frac{\alpha}{s+\alpha}\left(\frac{\alpha-s}{\alpha+s}\right)^n \qquad (2)$$

The transfer function $L_n(s)$, may therefore be implemented by employing a cascaded chain of individual networks, the first exhibiting a transfer function $$\frac{1}{s+\alpha}$$

e.g., network 30, and the remaining *n* sections each exhibiting a transfer function $$\frac{\alpha-s}{\alpha+s}$$

e.g., networks $30_2$ . . . $30_n$. Buffer amplifiers $35_1$, $35_2$ . . . $35_n$, of any desired construction, are employed to isolate the several networks.

Networks possessing the requisite transfer characteristics may be synthesized in a number of ways. The exact form depends upon the particular implementation employed. Thus, either a balanced or an unbalanced configuration may be used. FIG. 2 illustrates suitable networks. A transfer function $$\frac{1}{s+\alpha}$$

may be synthesized using the simple RC networks illustrated at A and B for the balanced and unbalanced conditions respectively. Transfer functions exhibiting a characteristic $$\frac{\alpha-s}{\alpha+s}$$

may be constructed as shown in C and D for the balanced and unbalanced conditions, respectively. It has been found that operation is satisfactory if, in each case, $1/\alpha=RC\cong 60$ microseconds.

Individual signals $x_i(t)$ produced at the junctions of the several networks 30 are individually adjusted in gain by means of controlled gain networks $33_1$, $33_2$, . . . $33_n$ through which they are directed. The adjusted signals are applied to summing amplifier 34. For a static situation, i.e., one in which a steady state signal is incoming on circuit 23, ordinary techniques for adjusting the relative gains of control networks 33 suffice to achieve a composite signal at the output of summing amplifier 34 sufficient to effect complete cancellation of an echo appearing in circuit 22. However, the situation is not a static one. Signals incoming on circuit 23 are generally speech signals characterized by erratic levels interspersed with silent intervals. Similarly, signals outgoing in circuit 22 comprise a combination of locally generated signals which vary considerably in magnitude and which are characterized by frequent silent intervals together with delayed and attenuated replicas of the incoming signal. These delays and attenuations constitute the transfer function of the echo path, and this may also vary considerably during a conversation. Accordingly, the characteristics of the transfer signals must be continuously adjusted, preferably prior to summation in amplifier 34 to assure that the signal developed at the input to combining network 25 closely approximates only the echo component, if any, appearing in outgoing circuit 22.

This continuous adjustment is made in the fashion taught in the aforementioned Kelly-Logan application. Briefly, a closed loop control system is employed. At the outset an initial replica signal produced by summing amplifier 34 is subtracted from the outgoing signal in network 25. The resultant difference signal represents, therefore, the locally generated signal plus the residue of the echo signal, assuming that complete cancellation was not effected. This composite signal constitutes an error component. It is delivered to error control network 28, which may be a nonlinear circuit. Preferably, error control network 28 employs an infinite clipper which reduces the error signal to a sequence of positive and negative pulses indicative of the polarity and the magnitude of the error signal. Infinite clipper networks are well known in the art and are described, for example, by J. C. R. Licklider and I. Pollack in the Journal of the Acoustical Society of America, vol. 20, 1948, at pages 42–51. The processed error signal is delivered by way of gate 29, enabled during periods of high signal magnitude in outgoing circuit 22, to modulators $31_1$, $31_2$, . . . $31_n$. The error signal is not, however, suitable by itself for indicating the necessary adjustment to be made to the respective signals $x_i(t)$. Accordingly, the error signal is multiplied in modulators 31 with the respective signal $x_i(t)$ and the resultant composite signal is averaged in integrating networks 32 to produce a signal whose polarity and magnitude indicate the appropriate correction for each gain adjusting network 33. Thus, if the error signal indicates a substantial remanent of the echo in the outgoing transmission network, gain control networks 33 are individually adjusted to pass a greater portion of the signal supplied from circuit 23. Hence the composite signal developed by summing amplifier 34 and removed from the outgoing signal in network 25 tends to remove the disparity and reduce the magnitude of the error signal. That is to say the system rapidly converges toward complete cancellation.

During burst of loud double-talking it has been found advantageous to break the control loop. This eliminates the possibility that the control loop may be momentarily upset and, upon a cessation of double-talking be required to resettle toward convergence. Loud double-talking may be detected by comparing the level of the signal in outgoing circuit 22 with the level of signals in incoming circuit 23. Speech detector 36, whose exact form is well known to those skilled in the art, may be used continuously to examine the relative levels of signals in the two circuits. Such a detector typically includes a rectifier and an integrator with a time constant of about 0.5 second. A signal produced by detector 36 may then be employed to control switching gate 29. In the closed gate position, the error control loop is complete; in the open condition, during double-talking the loop is open. Assuming that the maximum level of a typical echo is 6 db below the input signal, a signal 3 or less db below the input signal indicates double-talking. That is to say, speech detector 36 opens the control loop whenever the input level is less than about 3 db above that of the return signal.

The above described arrangements are of course merely illustrative of the application of the principles of the invention. It is apparent that the echo canceller of the invention need not be placed and used physically close to a hybrid terminating junction. Thus, one-way circuits 22 and 23 may be of any desired length; i.e., may connect the cancellation apparatus to a distant junction of a number of communications circuits. Numerous arrangements may be devised by those skilled in the art without departing from the spirit and scope of the invention.

What is claimed is:

1. An echo canceller which comprises, adjustable signal processing means connected to receive signals from the first of two one-way transmission paths of a communication system, said processing means including a generalized filter network for developing a plurality of linear transformations of signals received from said first one-way path, means connected in the second of said two one-way paths for algebraically combining signals in said second path with signals supplied from said processing means, and means responsive to said algebraically combined signal for adjusting said signal processing means.

2. An echo canceller as defined in claim 1 wherein said generalized filter network comprises, a plurality of pairs of bandpass filters, the filter of each pair having responses that are in phase quadrature with one another, and means for individually adjusting the gain of signals produced by said bandpass filters.

3. An echo canceller as defined in claim 1 wherein said generalized filter network comprises, a tapped active RC ladder network adjusted to exhibit Laguerre function impulse responses at said taps, and means for altering said adjustment.

4. An echo canceller as defined in claim 1 wherein said generalized filter network comprises, a cascaded chain of individual Laguerre networks, the first of which is adjusted to exhibit a transfer function $$\frac{1}{s+\alpha}$$

and the remaining ones of which are adjusted to exhibit a transfer function $$\frac{\alpha-s}{\alpha+s}$$

where $\alpha$ is selected such that $1/\alpha$ is approximately equal to RC=60 microseconds, where $s$ represents a signal applied to said chain of networks, and where the transfer function of said chain of networks is represented as $$L_n(s)=\frac{\alpha}{s+\alpha}\left(\frac{\alpha-s}{\alpha+s}\right)^n$$

in which $n$ is equal to the number of individual networks in said chain, and means for individually controlling the gain of signals produced by said individual networks.

5. An echo canceller as defined in claim 4 wherein each of said Laguerre networks comprises a balanced four-terminal RC network.

6. An echo canceller as defined in claim 4 wherein each of said Laguerre networks comprises an unbalanced four-terminal RC network.

7. An echo canceller as defined in claim 1 wherein said means for adjusting said signal processing means includes means for developing a signal indicative of the algebraic sign of said combined signals.

8. An echo canceller as defined in claim 1 wherein said means for adjusting said signal processing means includes a nonlinear signal transmission network.

9. An echo canceller as defined in claim 1 wherein said means for adjusting said signal processing means includes an infinite clipper network.

10. An echo canceller as defined in claim 1 wherein said means for adjusting said signal processing means includes, means for developing signals proportional, respectively, to the integral of the product of said algebraically combined signal and each of said linear transformation signals developed by said processing means.

11. A closed loop echo cancellation system for use in a two-way communication signal circuit which comprises, an adjustable generalized filter network supplied with signals incoming in said circuit for developing an approximation to signals outgoing in said circuit which are closely correlated to signals in said input circuit, means for algebraically combining said outgoing signals with signals developed by said filter network to produce a differential signal, and means responsive to said differential signal for adjusting said filter network.

12. A closed loop echo cancellation system as defined in claim 11 wherein said generalized filter network comprises, a plurality of active ladder networks, each of which is adjusted to exhibit a selected Laguerre function impulse response, a plurality of signal terminals connected at the junctions of said ladder networks, means for selectively adjusting the gain of signals developed at said terminals, and means for algebraically combining said adjusted signals.

13. A closed loop echo cancellation system as defined in claim 12 wherein said means for adjusting said ladder networks comprises, a network exhibiting a nonlinear characteristic supplied with said differential signals for developing error signals, and means for employing said error signals for controlling the gain of signals developed at said network terminals.

14. An adaptive echo canceller which comprises, in combination, a generalized filter network having an input terminal and a plurality of output terminals, means for supplying signals from a first of two interconnected communications circuits to said network, means for individually controlling the gains of signals developed at said plurality of output terminals of said network, means for selectively combining all of said gain adjusted signals, means for differentially combining said selectively combined signal with communications signals in the second of said interconnected communications circuits to produce an error signal, means for individually mixing each of said signals developed at said plurality of output terminals with said error signal, means for individually averaging the signals produced by said mixing means, and means for selectively gating said averaged signals individually to said gain controlling means.

15. In combination with the adaptive echo canceller defined in claim 14, means responsive to signals from said first and said second communications circuits for producing a control signal for intervals during which the level of signals in said first and said second circuits are approximately equal, and means for utilizing said control signal for inhibiting the mixing of said error signal with signals from said terminals.

References Cited

UNITED STATES PATENTS 2,825,764 3/1958 Edwards et al. ----- 179—170.2

KATHLEEN H. CLAFFY, Primary Examiner

W. A. HELVESTINE, Assistant Examiner